(12) United States Patent
Dresang et al.

(10) Patent No.: US 11,835,162 B1
(45) Date of Patent: Dec. 5, 2023

(54) BEARING ROTARY SWIVEL JOINT

(71) Applicant: UEMSI/HTV, Inc., Jackson, WI (US)

(72) Inventors: Richard D. Dresang, Hartford, WI (US); Stephen R. Frey, Waukesha, WI (US); Kevin J. Witt, Campbellsport, WI (US); Daniel M. Olson, Mequon, WI (US); Keith F. Jacobs, Milwaukee, WI (US)

(73) Assignee: UEMSI/HTV, INC., Jackson, WI (US)

( * ) Notice: Subject to any disclaimer, the term of this patent is extended or adjusted under 35 U.S.C. 154(b) by 0 days.

(21) Appl. No.: 18/130,084

(22) Filed: Apr. 3, 2023

(51) Int. Cl.
*F16L 27/08* (2006.01)
*F16C 33/74* (2006.01)
*F16C 17/02* (2006.01)

(52) U.S. Cl.
CPC ......... *F16L 27/0845* (2013.01); *F16C 17/02* (2013.01); *F16C 33/74* (2013.01); *F16L 27/0816* (2013.01); *F16C 2361/41* (2013.01); *F16L 27/0828* (2013.01); *Y10S 384/913* (2013.01)

(58) Field of Classification Search
CPC ............... F16L 27/0845; F16L 27/0816; F16L 27/0828; F16C 17/02; F16C 33/74; F16C 2361/41; Y10S 384/913
USPC .................................................. 285/98, 276
See application file for complete search history.

(56) References Cited

U.S. PATENT DOCUMENTS

| | | | | |
|---|---|---|---|---|
| 2,705,651 | A | * | 4/1955 | Myers ................... F16L 27/082 |
| 3,558,163 | A | | 1/1971 | Moore et al. |
| 4,478,438 | A | * | 10/1984 | Elorriaga, Jr. ...... F16L 27/0812 |
| | | | | 285/98 |
| 4,752,089 | A | * | 6/1988 | Carter ..................... F16L 37/23 |
| | | | | 285/276 |
| 5,110,159 | A | | 5/1992 | Herold et al. |
| 6,145,889 | A | | 11/2000 | Imai |
| 6,981,515 | B2 | * | 1/2006 | Horin ..................... F16K 27/02 |
| 7,422,031 | B2 | | 9/2008 | Benson et al. |
| 11,118,711 | B1 | | 9/2021 | Dresang et al. |

* cited by examiner

*Primary Examiner* — Greg Binda
(74) *Attorney, Agent, or Firm* — Donald J. Ersler

(57) ABSTRACT

A bearing rotary swivel joint preferably includes a swivel housing, a rotary swivel, an end plate, a solid bearing, a plurality of wear rings, a spring clip and a swivel seal. The swivel housing includes a threaded tube inlet and a swivel receiver bore. The rotary swivel includes a through bore, a threaded swivel inlet, a bearing diameter and an outer diameter. An O-ring groove is formed in the rotary swivel to receive the O-ring. The solid bearing is retained on the bearing diameter, terminated on each end with wear rings and axially retained with a spring clip against a bearing shoulder of the rotary swivel. The swivel seal is retained on the bearing diameter. The rotary swivel is inserted through a center bore in an end plate. The end plate is preferably fastened to the swivel housing with a plurality of fasteners.

14 Claims, 6 Drawing Sheets

BEARING ROTARY SWIVEL JOINT

BACKGROUND OF THE INVENTION

1. Field of the Invention

The present invention relates generally to the sewer industry and more specifically to a bearing rotary swivel joint, which is an improvement over prior art rotary swivel joints used in the sewer industry.

2. Discussion of the Prior Art

A prior art rotary swivel joint typically includes two sets of ball bearings, which must be counted out and manually loaded during manufacture and servicing of the rotary swivel joint. The prior art rotary swivel joint was first invented in the 1940s and has not been improved upon since. If less than the correct number of ball bearings are added, the rotary swivel joint will still work, but the ball bearings will wear out prematurely. The two sets of ball bearings must also be lubricated periodically. The gland nut must be periodically adjusted to a sweet spot of tension to exert force on a pair of rubber seals that wear down over time. The process of adjusting tension on the pair of rubber seals requires an operator to remove a screw on the housing, remove a position tab, tighten the gland nut, replace the position tab in one of two slots, and reinstall the screw. Additionally, water can leak through the gland nut threads and set screws that are used to load and retain the ball bearings.

Replacing one of the two o-rings requires all the ball bearings to be removed by unscrewing two set screws; a degreasing agent must be used to allow the ball bearing to be removed through the two set screw threaded hole; the process of removing ball bearings frequently requires a number of minutes to bang the unit to get all the ball bearings out; a locking tab screw must be removed and then a locking tab; the gland nut is then unscrewed from the housing; the process will take upwards of 30 minutes to complete if the mechanic does not lose any of the balls; and then the process is reversed for reassembly. The distance between a centerline of the ball bearings is very small, which produces poor axially loading. U.S. Pat. No. 5,110,159 to Herold et al. discloses a rotating union for supplying compressed air to a rotating part of a printing press. U.S. Pat. No. 3,558,163 to Moore et al. discloses a swivel connector for tubing. U.S. Pat. No. 6,145,889 to Imai discloses a rotary joint. U.S. Pat. No. 7,422,031 to Benson et al. discloses rotary unions, fluid delivery systems, and related methods. U.S. Pat. No. 11,118,711 to Dresang et al. discloses a rotary swivel joint. However, the Dresang et al. ball bearing race design did not meet the requirements of durability.

Accordingly, there is a clearly felt need in the art for a rotary swivel joint, which does not periodically have to be greased; does not require an adjustment of a gland nut to tension two seals; eliminates a sealing ring and a gland nut; does not require an extensive disassembly to replace a worn O-ring relative to the prior art, which includes an oil impregnated bronze bearing that does not require maintenance or to be manually loaded into the rotary swivel joint and which includes a swivel seal that is self-adjusting instead of two seals that need to be periodically tensioned.

SUMMARY OF THE INVENTION

The present invention provides a bearing rotary swivel joint, which does not require periodic maintenance. The bearing rotary swivel joint preferably includes a swivel housing, a rotary swivel, an end plate, a solid bearing, a plurality of wear rings, a spring clip and a seal. The swivel housing includes a threaded tube inlet and a swivel receiver bore. It is preferable that a centerline of the threaded tube inlet be located at a 90 degree angle to a centerline of the swivel receiver bore. However, the threaded tube inlet and the swivel receiver bore could be on the same centerline. The threaded tube inlet is formed in one end of the swivel housing and the swivel receiver bore is formed in an opposing end of the swivel housing. The swivel receiver bore includes a rotary swivel bore and a bearing bore. The rotary swivel bore is formed at a bottom of the swivel receiver bore to receive an end of the rotary swivel. The bearing bore is sized to firmly receive an outer diameter of the swivel seal and to receive an outer diameter of the solid bearing.

The rotary swivel includes a through bore, an outer diameter, a O-ring diameter and a bearing diameter. The through bore is formed through a length of the rotary swivel. A threaded swivel inlet is formed in an entrance to the through bore. The outer diameter is located on one end of the rotary swivel. One end of the O-ring diameter is located adjacent the outer diameter. The bearing diameter is located adjacent an opposing end of the O-ring diameter. An O-ring groove is formed in the O-ring diameter to receive an O-ring. At least one lubrication groove is formed in the bearing diameter to receive oil or grease. A snap ring groove is formed near an end of the bearing diameter. A spring clip axially retains the solid bearing on the bearing diameter.

The end plate includes a center bore and a plurality of counterbore holes. A plurality of threaded taps are formed in a face of the opposing end of the swivel housing to threadably receive a plurality of fasteners. The end plate is used to axially retain the solid bearing and the rotary swivel in the swivel housing.

Accordingly, it is an object of the present invention to provide a rotary swivel joint, which includes a solid bearing, which does not have to be periodically greased, or manually loaded during maintenance.

It is a further object of present invention to provide a rotary swivel joint, which eliminates a sealing ring and a gland nut.

It is another object of present invention to provide a rotary swivel joint, which does not require an adjustment of a gland nut to tension two seals.

It is yet another object of present invention to provide a rotary swivel joint, which does not require an extensive disassembly to replace a worn O-ring relative to that of the prior art.

It is yet another object of present invention to provide a rotary swivel joint, which includes a solid bearing which does not require maintenance or to be manually loaded into the rotary swivel joint.

Finally, it is another object of the present invention to provide a rotary swivel joint, which includes a swivel seal that is self-adjusting instead of two seals that need to be periodically tensioned.

These and additional objects, advantages, features and benefits of the present invention will become apparent from the following specification.

DETAILED DESCRIPTION OF THE PREFERRED EMBODIMENTS

Figure 1:
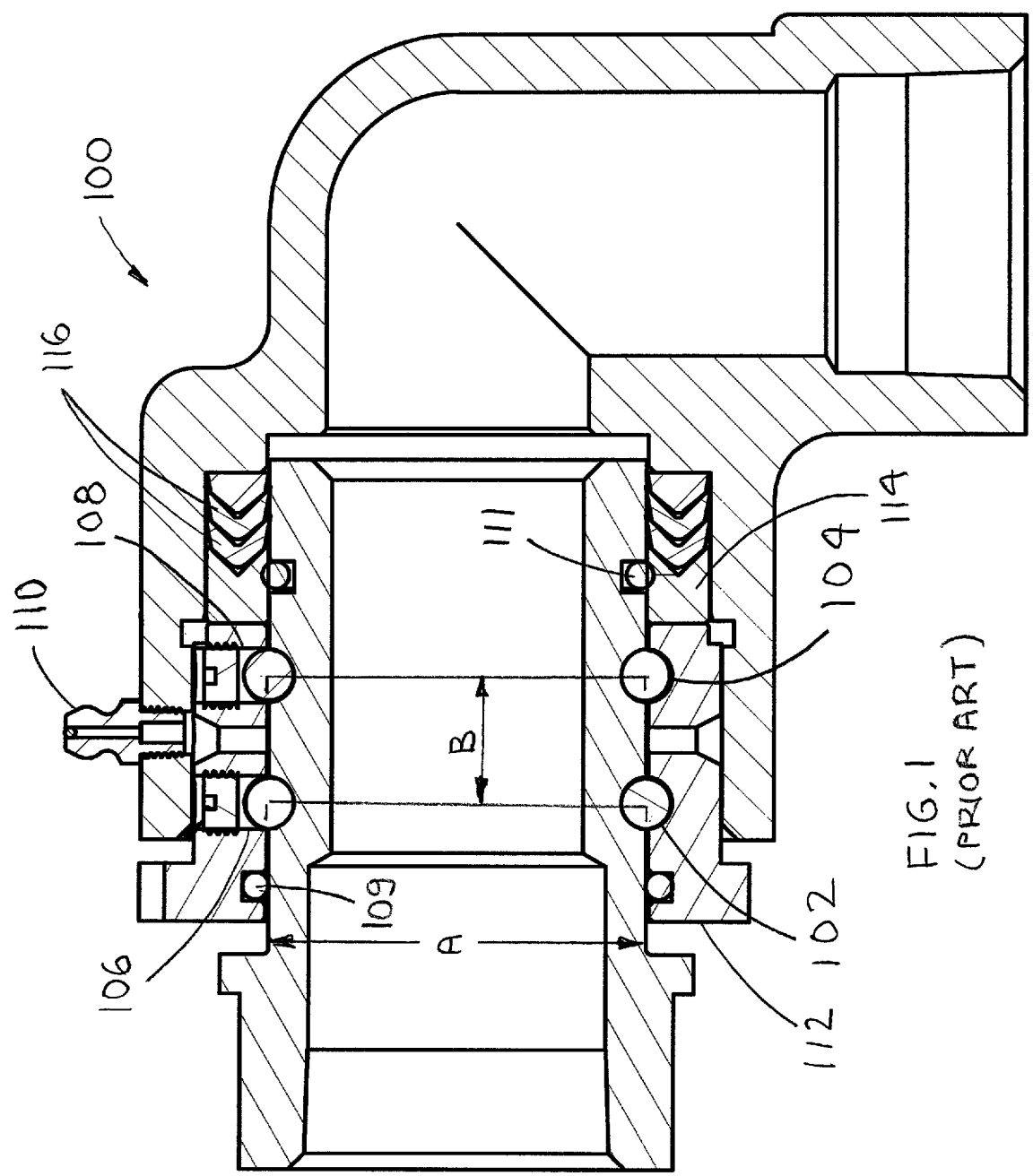
FIG. 1 is a cross sectional view of a prior art rotary swivel joint used in the sewer industry.

With reference to FIG. 1, a prior art rotary swivel joint 100 is shown. The prior art rotary swivel joint 100 typically includes two sets of ball bearings 102, 104, which must be manually loaded through tapped holes 106, 108. The two sets of ball bearings 102, 104 must also be lubricated periodically through a zerk fitting 110. Additionally, the rotary swivel joint 100 includes a gland nut 112 and a sealing ring 114, which are eliminated from a rotary swivel joint 1. Replacing one of the two 109, 111, requires the extensive process of removing and reinstalling the two sets of ball bearings 102, 104. Tension on two seals 116 must be periodically adjusted by rotating the gland nut 112. Axially loading of the two sets of ball bearings 102, 104 has a poor ratio of 0.337. Dimension A has a typical value of 1.870 inches and dimension B has a typical value of 0.630 inches. The ratio of dimension B/dimension A is 0.337.

Figure 3:
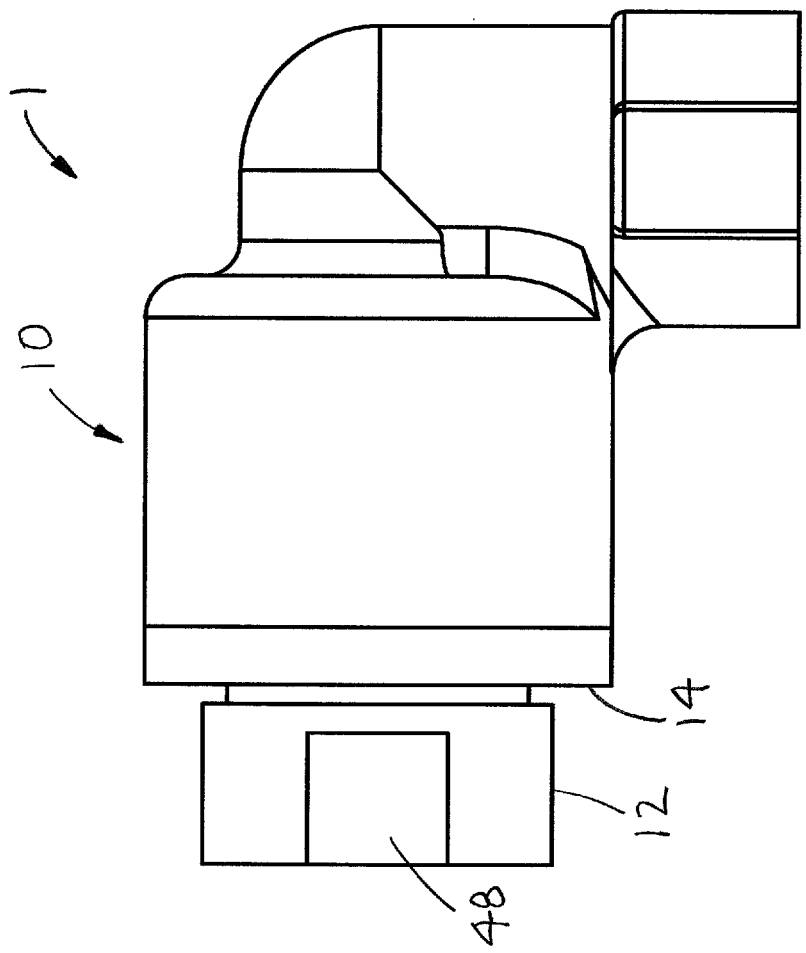
FIG. 3 is a side view of a bearing rotary swivel joint in accordance with the present invention.
Figure 2:
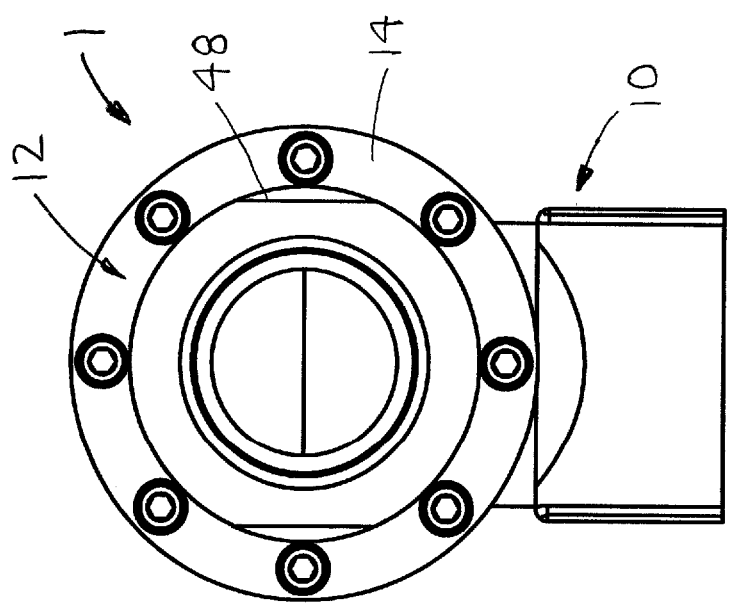
FIG. 2 is a front view of a bearing rotary swivel joint in accordance with the present invention.
Figure 4:
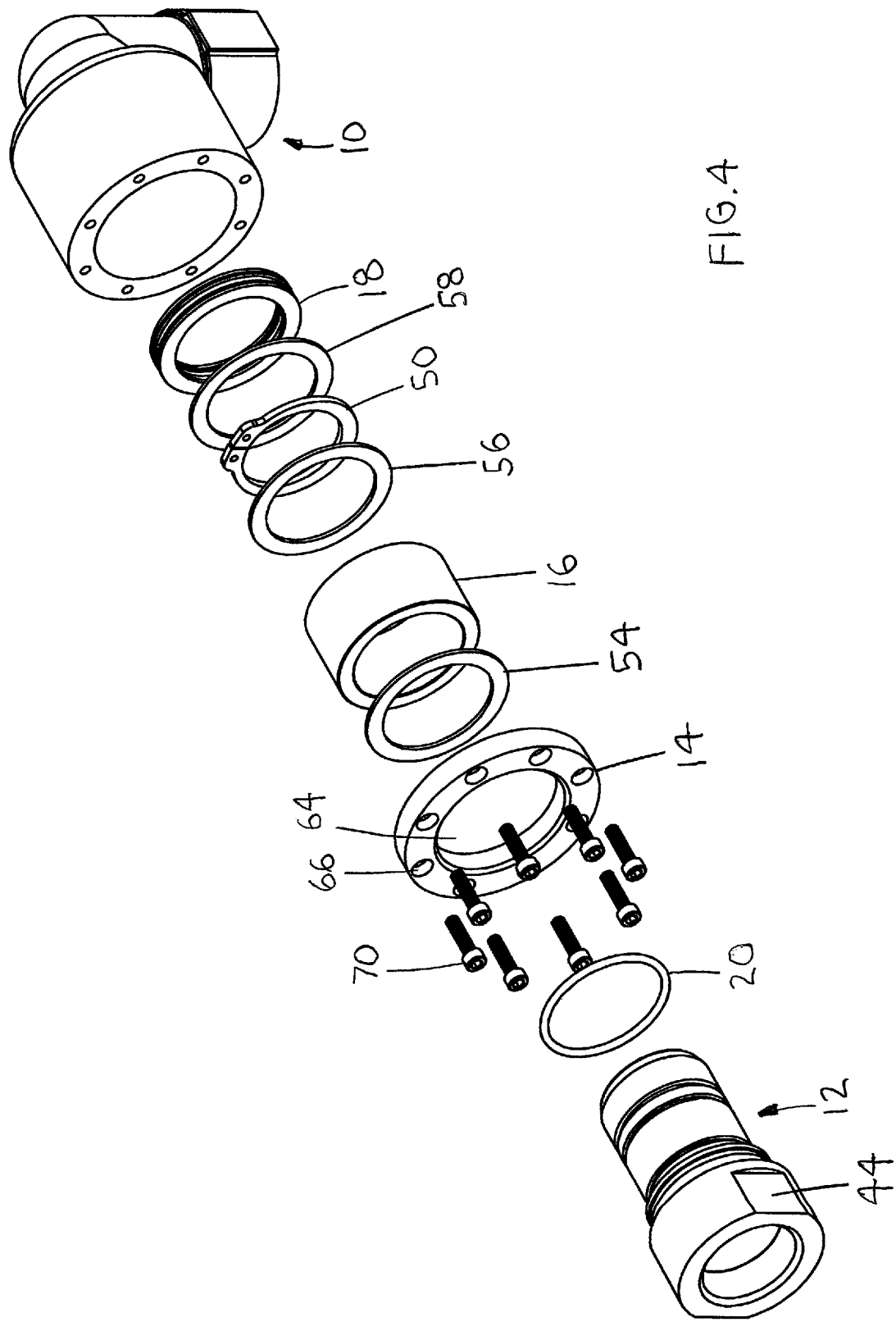
FIG. 4 is an exploded perspective view of a bearing rotary swivel joint in accordance with the present invention.
Figure 5:
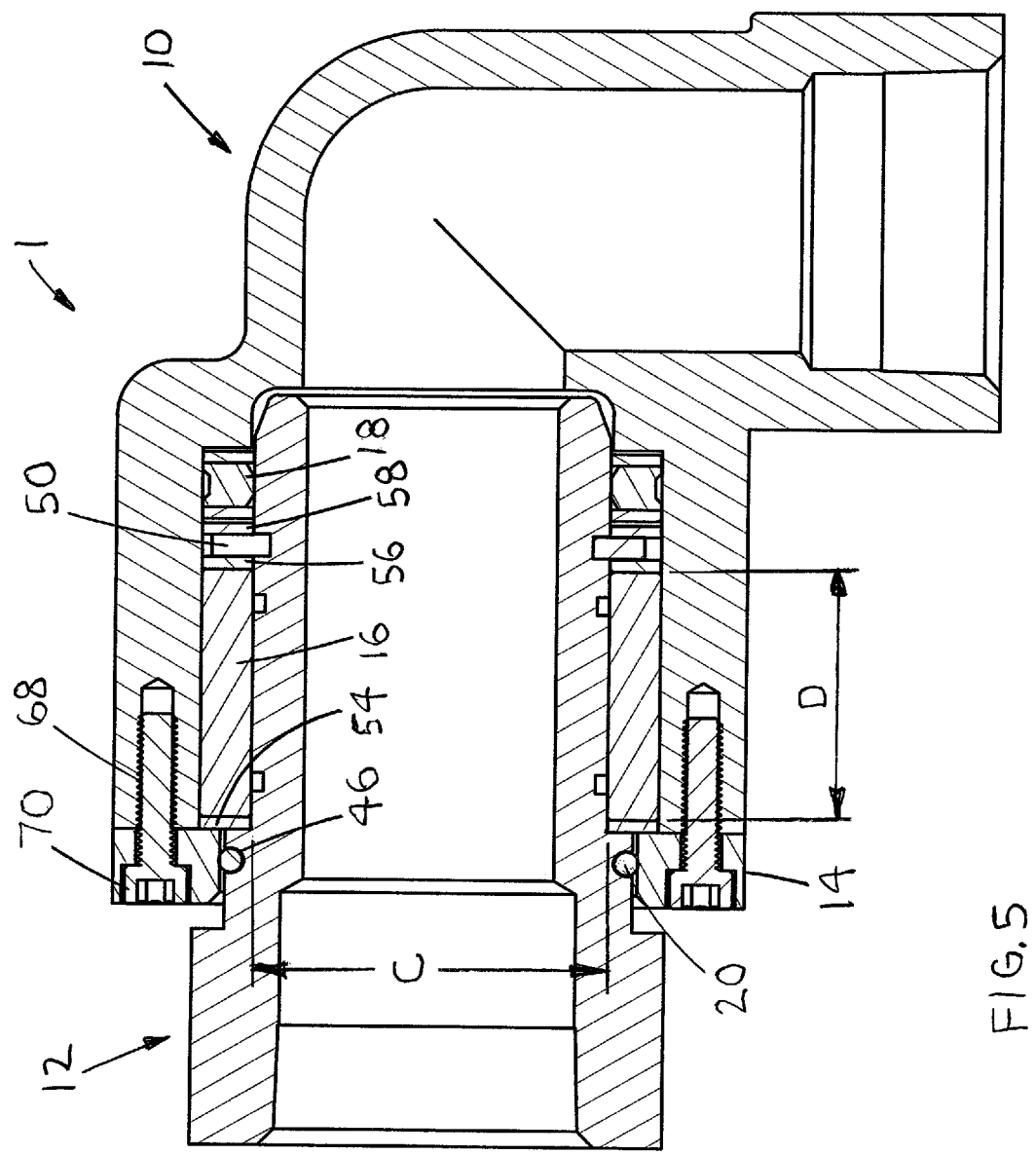
FIG. 5 is a cross sectional of a bearing rotary swivel joint in accordance with the present invention.
Figure 6:
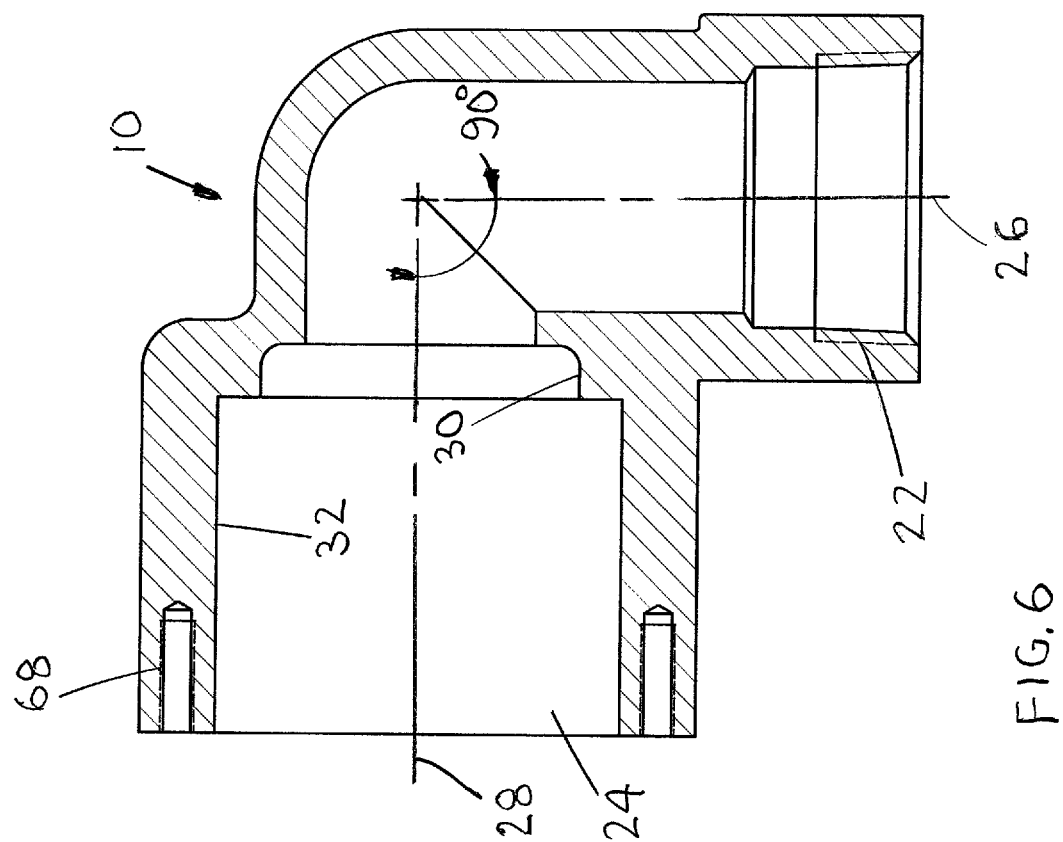
FIG. 6 is a cross sectional view of a swivel housing of a bearing rotary swivel joint in accordance with the present invention.

With reference now to the drawings, and particularly to FIG. 3, there is shown the rotary swivel joint 1. With reference to FIGS. 2, 4 and 5, the rotary swivel joint 1 preferably includes a swivel housing 10, a rotary swivel 12, an end plate 14, a solid bearing 16, a swivel seal 18 and an O-ring With reference to FIG. 6, the swivel housing 10 includes a threaded tube inlet 22 and a swivel receiver bore 24. A centerline 26 of the threaded tube inlet 22 is preferably located at a 90 degree angle (or perpendicular) relative to a centerline 28 of the swivel receiver bore 24. However, the threaded tube inlet 22 and the swivel receiver bore 24 could be on the same centerline. The threaded tube inlet 22 is formed in one end of the swivel housing 10 and the swivel receiver bore 24 is formed in an opposing end of thereof. A pipe or hose is threaded into the threaded tube inlet 22. The swivel receiver bore 24 includes the rotary swivel bore 30 and a bearing bore 32. The rotary swivel bore 30 is formed at a bottom of the swivel receiver bore 24 to provide clearance for the rotary swivel 12. The bearing bore 32 is sized to firmly receive an outer diameter of the swivel seal 20. An outer diameter of the solid bearing 16 is sized to be received by the bearing bore 32. The following dimension are given by way of example and not by way of limitation. An inner diameter C of the solid bearing 16 is typically 1.77 inches. A length of the solid bearing 16 is typically 1.22 inches. A ratio between diameter C and distance D is 0.69. It is preferred that the ratio between diameter C and distance D be at least 0.69. The 0.69 is a vast improvement over the prior art ratio of 0.34.

Figure 7:
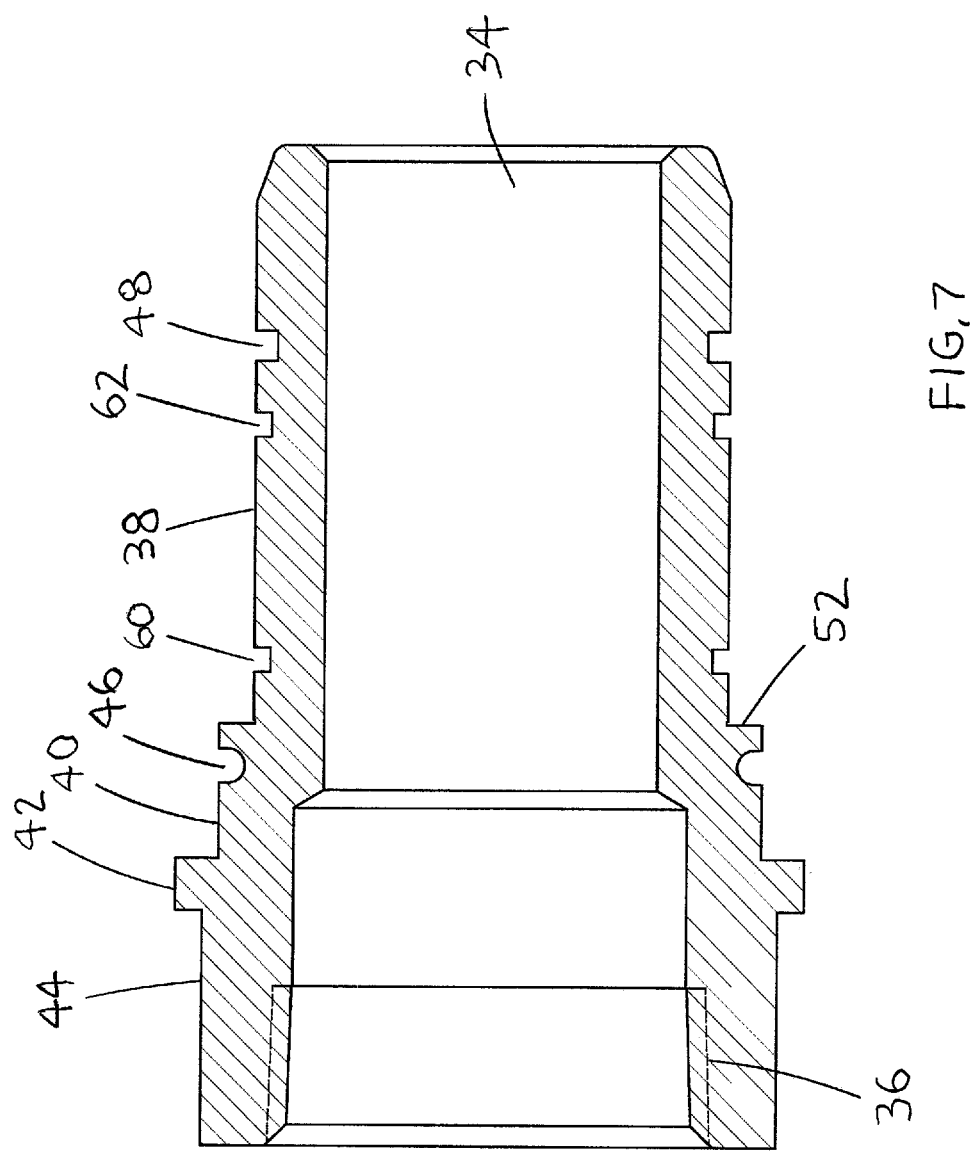
FIG. 7 is a cross sectional view of a rotary swivel of a bearing rotary swivel joint in accordance with the present invention.

With reference to FIG. 7, the rotary swivel 12 includes a through bore 34, a threaded swivel inlet 36, a bearing diameter 38, an O-ring sealing diameter 40 and an outer diameter 42. The through bore 34 is formed through a length of the rotary swivel 12. The threaded swivel inlet 36 is formed in one end of the rotary swivel 12. A second pipe or hose is threaded into the threaded swivel inlet 36. The outer diameter 42 is formed on one end of the rotary swivel 12. A wrench flat 44 is formed in the outer diameter 42. The bearing diameter 38 is located on an opposing end of the rotary swivel 12. The O-ring sealing diameter 40 is located between the bearing diameter 38 and the outer diameter 42. An O-ring groove 46 is formed in the O-ring sealing diameter 40 to receive the O-ring 20. A clip groove 48 is formed near the opposing end of the rotary swivel 12 to receive a spring clip 50. A bearing shoulder 52 is created by a transition between the bearing diameter 38 and O-ring sealing diameter 40. The solid bearing 16 is retained on the bearing diameter 38. A first wear ring 54 is located between the bearing shoulder 52 and a first end of the solid bearing 16. A second wear ring 56 is located between a second end of the solid bearing 16 and one side of the spring clip 50. A third wear ring 58 is located between an opposing side of the spring clip 50 and a first side of the swivel seal 18. The spring clip 50 axially retains the solid bearing 16 against the bearing shoulder 52. The bearing diameter 38 of the rotary swivel 12 is inserted through the swivel seal 18. The swivel seal 18 is self-adjusting; fluid pressure of the media that flows through the rotary swivel joint 1; and forces a lip of the swivel seal 18 against the rotary swivel 12. The higher, the pressure of the fluid, the greater the sealing of the swivel seal 18. The swivel seal 18 is preferably a rod buffer seal sourced from Parker Hannifin Corporation. However, other seals may also be used. A first lubrication groove 60 and a second lubrication groove 62 are formed in the bearing diameter 38 and between the first and second ends of the solid bearing 16 to receive a suitable lubricant, such as oil, grease or both.

The end plate 14 includes a center bore 64 and a plurality of counter sunk holes 66. A plurality of threaded taps 68 are formed in a face of the opposing end of the swivel housing 10 to threadably receive a plurality of fasteners 70. The end plate 14 is used to axially retain the solid bearing 16 and the rotary swivel 12 in the swivel receiver bore 24. However, methods of retaining the end plate 14 against the swivel housing 10 could also be used. The rotary swivel joint 1 is preferably assembled in the following manner. The O-ring 20 is placed in the O-ring groove 46. The rotary swivel 12 is inserted through center bore 64 in the end plate 14. The first wear ring 54 is pushed on to the bearing diameter 38; the solid bearing 16 is pushed on to the bearing diameter 38; the second wear ring 54 is pushed on to the bearing diameter 38; and the solid bearing 16 is retained in place with the spring clip 50 inserted into the clip groove 48. The third wear ring 58 is pushed on to the sealing diameter 38. Then the swivel seal 18 is pushed on to bearing diameter 38. The rotary swivel 12 is then pushed into the swivel receiver bore 24. The end plate 14 is then secured to the opposing end of the swivel housing 10 with the plurality of fasteners 70. Fluid pressure inside the rotary swivel joint is about 2,500 psi-6,500 psi.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A rotary swivel joint comprising:
a rotary swivel includes a through bore and a swivel bearing diameter, a swivel inlet is formed in said through bore on one end;
a solid bearing includes an inner bearing diameter and an outer bearing diameter, said solid bearing is fabricated from an oil impregnated bronze;
a first wear ring contacts a first end of said solid bearing;
a second wear ring includes one side contacting a second end of said solid bearing;
a spring clip is engaged with said swivel bearing diameter, said spring clip makes contact with an opposing side of said second wear ring; and
an end plate includes a center bore, wherein said rotary swivel is inserted through said center bore, said inner bearing diameter is retained on said swivel bearing diameter, said rotary swivel is inserted into said bearing bore, said bearing bore is sized to receive said outer bearing diameter, said end plate is secured to said opposing end of said swivel housing.

2. The rotary swivel joint of claim 1, wherein:
a bearing shoulder is formed on said rotary swivel on one end of said swivel bearing diameter, one side of said first wear ring is in contact with said solid bearing, the other side of said wear ring is in contact with said bearing shoulder.

3. The rotary swivel joint of claim 1 wherein:
a centerline of said tube inlet is perpendicular to said bearing bore.

4. The rotary swivel joint of claim 1 wherein:
a ratio between a length of said solid bearing and said inner bearing diameter is at least 0.69.

5. A rotary swivel joint comprising:
a swivel housing includes a tube inlet on one end and a bearing bore in an opposing end thereof;
a rotary swivel includes a through bore and a swivel bearing diameter, a threaded swivel inlet is formed in said through bore on one end;
a solid bearing includes an inner bearing diameter and an outer bearing diameter, said solid bearing is fabricated from an oil impregnated bronze;
a first wear ring contacts a first end of said solid bearing, wherein said first wear ring prevents premature wear of said solid bearing;
a second wear ring includes one side contacting a second end of said solid bearing, wherein said second wear ring prevents premature wear of said solid bearing;
a spring clip is engaged with said swivel bearing diameter, said spring clip makes contact with an opposing side of said second wear ring; and
an end plate includes a center bore, wherein said rotary swivel is inserted through said center bore, said inner bearing diameter is retained on said swivel bearing diameter, said rotary swivel is inserted into said bearing bore, said end plate is secured to said opposing end of said swivel housing.

6. The rotary swivel joint of claim 5, wherein:
a bearing shoulder is formed on said rotary swivel on one end of said swivel bearing diameter, one side of said first wear ring is in contact with said solid bearing, the other side of said first wear ring is in contact with said bearing shoulder.

7. The rotary swivel joint of claim 5, further comprising:
an O-ring groove is formed in an O-ring diameter on said rotary swivel, said O-ring diameter is located adjacent said one end of said swivel bearing diameter, an O-ring is retained in said groove.

8. The rotary swivel joint of claim 5 wherein:
a centerline of said tube inlet is perpendicular to said bearing bore.

9. The rotary swivel joint of claim 5 wherein:
a ratio between a length of said solid bearing and said inner diameter of said solid bearing is at least 0.69.

10. The rotary swivel joint of claim 5, further comprising:
a third wear ring is located between said spring clip and a swivel seal.

11. A rotary swivel joint comprising:
a swivel housing includes a tube inlet on one end and a bearing bore in an opposing end thereof;
a rotary swivel includes a through bore and a swivel bearing diameter, a threaded swivel inlet is formed in said through bore on one end;
an oil impregnated bronze solid bearing includes an inner bearing diameter and an outer bearing diameter;
a first wear ring contacts a first end of said solid bearing;
a second wear ring includes one side contacting a second end of said solid bearing;
a spring clip is engaged with said swivel bearing diameter, said spring clip includes one side contacting an opposing side of said second wear ring;
a third wear ring makes contact with an opposing side of said spring clip;
a swivel seal is retained on said swivel bearing diameter, said swivel seal makes contact with said third wear ring; and
an end plate includes a center bore, wherein said rotary swivel is inserted through said center bore, said inner bearing diameter is retained on said swivel bearing diameter, said rotary swivel is inserted into said bearing bore, said bearing bore is sized to receive said outer bearing diameter, said end plate is secured to said opposing end of said swivel housing.

12. The rotary swivel joint of claim 11, wherein:
a bearing shoulder is formed on said rotary swivel on one end of said swivel bearing diameter, one side of said first wear ring is in contact with said solid bearing, the other side of said first wear ring is in contact with said bearing shoulder.

13. The rotary swivel joint of claim 11 wherein:
a centerline of said tube inlet is perpendicular to said bearing bore.

14. The rotary swivel joint of claim 11, wherein:
a ratio between a length of said solid bearing and said inner bearing diameter is at least 0.69.

* * * * *